Sept. 15, 1936.   P. B. REEVES   2,054,339
BELT AND METHOD OF MAKING SAME
Filed Oct. 13, 1933
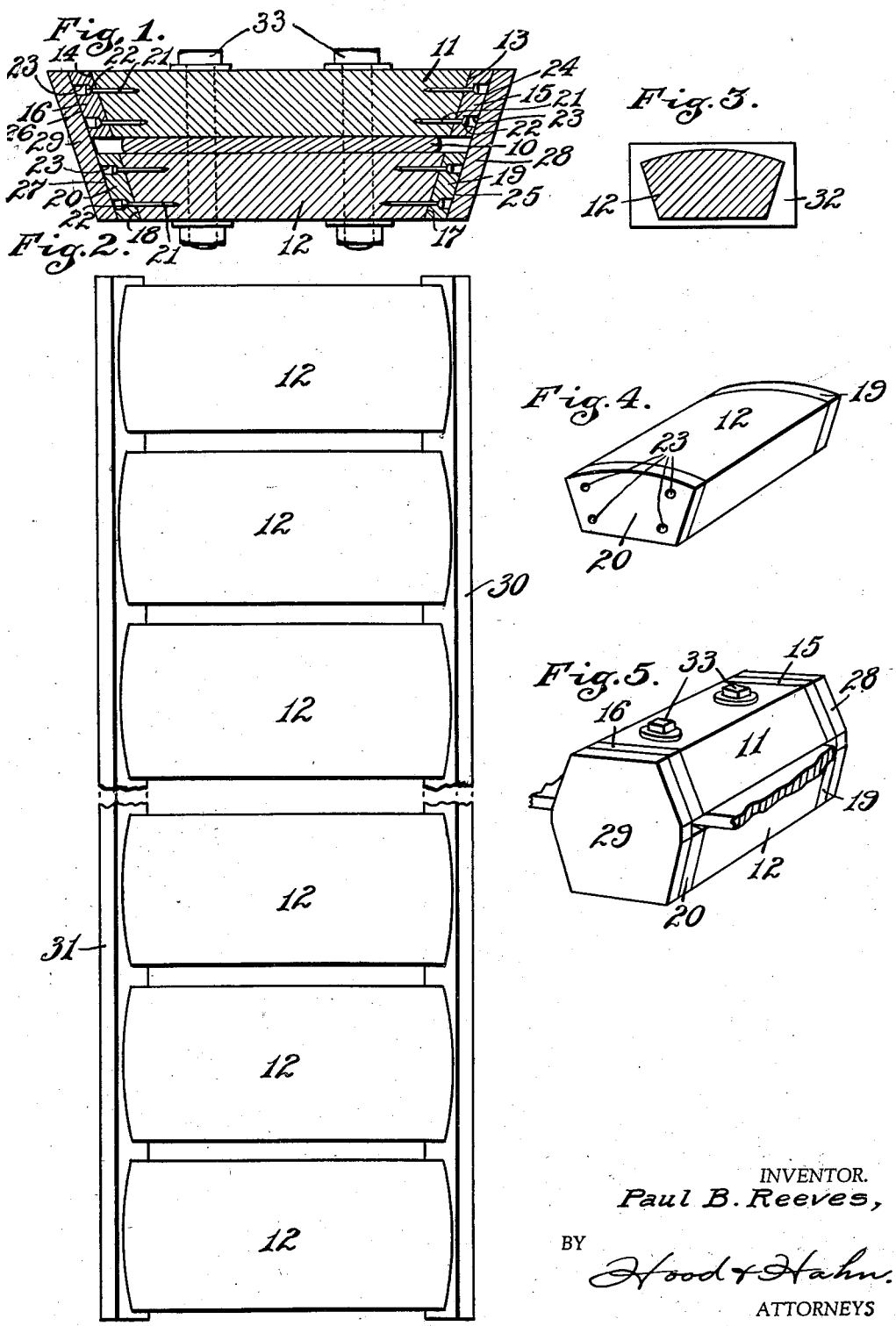
INVENTOR.
Paul B. Reeves,
BY Hood & Hahn.
ATTORNEYS Patented Sept. 15, 1936

2,054,339

UNITED STATES PATENT OFFICE 2,054,339

BELT AND METHOD OF MAKING SAME

Paul B. Reeves, Columbus, Ind., assignor to Reeves Pulley Company, Columbus, Ind., a corporation of Indiana Application October 13, 1933, Serial No. 693,473

4 Claims. (Cl. 74—236)

The present application relates to a belt and method of making the same; and more particularly to a V or edge-active belt of the type used in connection with V pulleys, and more particularly in connection with the well known "Reeves" type of variable speed transmission.

The primary objects of the invention are to construct a belt which will be more efficient in the first instance, and which will be of longer life than belts of the same general character which have been in use heretofore.

Further objects of the invention will appear as the description proceeds.

To the accomplishment of the above and related objects, my invention may be embodied in the form illustrated in the accompanying drawing, attention being called to the fact, however, that the drawing is illustrative only, and that change may be made in the specific construction illustrated and described, or in the specific steps stated, so long as the scope of the appended claims is not violated.

Fig. 1 is a transverse section through a finished belt;

Fig. 2 is a plan view showing the arrangement of the various elements in one step of the process of making a belt in accordance with the present invention;

Fig. 3 is a transverse section through a block after the same has been separated from the ribbon shown in Fig. 2;

Fig. 4 is a perspective of a finished block before attachment to the web; and

Fig. 5 is a perspective view of one complete segment of a finished belt.

In the past, belts intended to be used in connection with Reeves transmissions have been made up of a web 10 having secured to the opposite faces thereof a series of blocks 11 and another series of blocks 12, said blocks extending transversely of said belt and being arranged in parallelism spaced longitudinally of the belt. The longitudinal section of each block 11 is an isosceles trapezoid, the non-parallel sides 13 and 14 of which lie in the end faces of the block and are projected beyond the lateral edges of the web 10. Similarly, the longitudinal section of each block 12 is an isosceles trapezoid, the non-parallel sides of which lie in the end faces of the block. In assembling the blocks 11 and 12 with the web 10, each block 12 is positioned immediately below, and in parallelism with, a block 11; and the end faces 17 and 18 of each block 12 constitute substantially continuations of the end faces 13 and 14 of a corresponding block 11.

The blocks 11 and 12 are usually made of wood, and wood does not have a satisfactorily high coefficient of friction on steel. Therefore, it has been common practice to provide the end faces of the blocks 11 and 12 with pads of friction material, such as leather, or the like. In Fig. 1, such a pad 15 is applied to the face 13, a pad 16 is applied to the face 14, a pad 19 is applied to the face 17, and a pad 20 is applied to the face 18. Said pads 15, 16, 19, and 20 are secured to the respective end faces of the blocks 11 and 12 by initially gluing the same in place, and thereafter further securing the same by means of nails 21 having heads 22 which are necessarily sunk in sockets 23 in said pads. Obviously, the nail heads 22 must not be flush with the outermost surfaces of the pads 15, 16, 19, and 20 if those pad surfaces are to become friction surfaces cooperating with metal pulleys. It has been found that the pads cannot be effectively secured to the block ends by means of any known glue, alone; but must be further secured thereto by means of nails, or the like.

It has been said that the face 17 is substantially a continuation of the face 13, and that the face 18 is substantially a continuation of the face 14 after assembly of the blocks 11 and 12 with the web 10. It is practically impossible, however, to make this alignment absolute; and furthermore, the operation of securing the pads 15, 16, 19, and 20 to said faces often results in distortion of said pads; wherefrom it follows that the outermost faces 24 and 25 of the pads 15 and 19 are not truly in alignment, and the faces 26 and 27 of the pads 16 and 20 are not truly in alignment. Consequently, it has been necessary, in practice, to perform a final machining operation, after the belt has been otherwise completed, whereby said faces 24 and 25 of all of the pads 15 and 19 are brought into absolutely proper relation; and whereby the faces 26 and 27 of all of the pads 16 and 20 are brought into absolutely proper relation.

This machining operation is inevitably accompanied by two distinct disadvantages. First, it necessarily reduces the thickness of material between the faces 24, 25, 26, and 27 of some of the pads and the heads 22 of the securing nails 21; whereby the life of the belt is reduced. Second, it removes from many, if not all, of the pads, large portions of the hair side of the leather; and it is well known that the untrimmed hair side forms the best possible leather friction surface.

I have discovered that, whereas there is no known glue which will, unaided, satisfactorily hold the pads 15, 16, 19, and 20 to the wooden surfaces of the blocks 11 and 12, the glue which is ordinarily used to aid in holding said pads to said surfaces will, unaided, hold further leather pads 28 and 29 securely on the outermost faces of the pads 15, 16, 19, and 20. My invention, therefore, contemplates the application of a pad 28 to the outer surfaces 24 and 25 of each pair of pads 15 and 19, and the application of a pad 29 to the outer surfaces 26 and 27 of each pair of pads 16 and 20; said pad 28 bridging the space between the pads 15 and 19, and said pad 29 bridging the space between said pads 16 and 20. Because it is not necessary to use nails, or other securing means, to hold the pads 28 and 29 in place, said pads 28 and 29 are not distorted after application to the organization; and because said pads 28 and 29 are not distorted, and because they are applied to surfaces which are absolutely aligned, it is not necessary to machine the outermost surfaces of said pads 28 and 29.

Consequently, the two above-mentioned disadvantages are overcome by my invention. The thickness of material between the friction surfaces and the nail heads 22 is greatly increased by the use of the pads 28 and 29. And the untrimmed hair side of the leather is thus made available as a friction surface, throughout the length of the belt.

The structure of my invention has a further advantage. Because of the fact that the pads 28 and 29 bridge the spaces between the pads 15 and 19 and between the pads 16 and 20, respectively, the effective friction surface of the belt is somewhat increased.

While the belt of my invention may be built up in any desired manner, I prefer to follow the hereinafter described process.

Two strips of leather, or the like, 30 and 31 are supported, respectively, upon the opposite walls of a trough (not shown). Blocks 12, previously formed to desired shape, are preliminarily coated, on their opposite ends 17 and 18, with a suitable glue; and then are deposited upon the strips 30 and 31; the faces 17 of said blocks contacting the strip 30 and the faces 18 of said blocks contacting the strip 31. Because of the converging relation of the faces 17 and 18, and because the adjacent faces of the strips 30 and 31 are positioned in similarly converging planes, said blocks will be supported in this position. As shown in Fig. 2, the blocks 12 are arranged in parallel spaced relation.

Blocks 11 are similarly supported upon other strips of leather (not shown).

Hardening of the glue results in the provision of ribbons comprising the strips 30 and 31 secured together in spaced relationship by the blocks 12 or 11. The ribbon illustrated in Fig. 2 is removed from the forming trough, and is cut between the blocks 12; whereby there are formed a plurality of units indicated in Fig. 3, each comprising a block 12 having secured to its opposite ends rectangular pieces 32 of leather.

Thereafter, the leather pieces 32 are trimmed to conform to the cross sectional shape of the blocks 12 or 11 to which they are secured; and nails 21 are driven through, and punch-sunk in, said leather pieces to aid in securing the same to the blocks. Thereby, units such as that illustrated in Fig. 4 are formed.

A series of such units is then attached to each surface of a web 10, preferably by means of bolts 33, or other suitable fastening means. Thereafter, the completed belt is mounted on a drum and is rotated past a cutting tool which is gradually advanced radially of the drum. Obviously, such operation results in the production of an interrupted conical surface comprising the trimmed pads at the ends of the blocks. The pads at the two ends of the blocks may be simultaneously trimmed; or the pads at one end may be trimmed, and the belt then reversed to trim the pads at the other end. This trimming operation may be performed upon a single drum, or upon two spaced drums of smaller diameter, the belt extending partially around each of the two drums.

In any case, the trimming operation results in bringing all of the outermost faces of the leather pieces on one edge of the belt into a single conical surface; and bringing all of the outermost faces of the pads on the other edge of the belt into another single conical surface.

Thereafter, in any suitable manner, preformed pads 28 and 29 are glued in place upon the pads 15 and 19 and the pads 16 and 20. This gluing operation may, if desired, be performed in troughs similar to the troughs used in initially securing the blocks 12 to the strips 30 and 31.

I claim as my invention:

1. A V belt comprising a web, a series of transversely-extending blocks secured to a face of said web, a pad of leather secured to each transversely-facing end of each block, nails securing said pads to said block ends, and a piece of leather secured solely by an adhesive film to the outwardly-directed face of each of said pads.

2. A V belt comprising a web, a series of transversely-extending blocks secured to a face of said web, a pad of leather secured to each transversely-facing end of each block, nails securing said pads to said block ends, the outwardly-directed faces of all of said pads adjacent the same edge of said belt being shaped to correspond to a conical surface, and a piece of leather secured solely by an adhesive film to the outwardly-directed face of each of said pads.

3. A V belt comprising a web, a series of transversely-extending blocks secured to a face of said web, a pad of leather secured to each transversely-facing end of each block, nails securing said pads to said block ends, and a piece of leather secured to the outwardly-directed face of each of said pads, the untrimmed hair-side of each of said last-named pieces being exposed.

4. A V belt comprising a web, a series of transversely-extending blocks secured to a face of said web, a pad of leather secured to each transversely-facing end of each block, nails securing said pads to said block ends, a second series of blocks secured to the other face of said web, the blocks of said series being positioned in correspondence with the blocks of said first series, a pad of leather secured to each transversely-facing end of each block of said second series, nails securing said pads to said last-named block ends, the outwardly-directed faces of all of said pads adjacent the same edge of said belt conforming to a single conical surface of predetermined curvature, and a piece of leather secured to and bridging the outwardly-directed faces of corresponding pads on each corresponding pair of blocks in said two series.

PAUL B. REEVES.